(12) United States Patent
Gonze et al.

(10) Patent No.: US 9,016,047 B2
(45) Date of Patent: Apr. 28, 2015

(54) SYSTEM AND METHOD FOR EXHAUST GAS AFTERTREATMENT

(71) Applicant: GM Global Technology Operations LLC, Detroit, MI (US)

(72) Inventors: Eugene V. Gonze, Pinckney, MI (US); Chang H. Kim, Rochester, MI (US); Michael J. Paratore, Jr., Howell, MI (US); George M. Claypole, Fenton, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 162 days.

(21) Appl. No.: 13/768,283

(22) Filed: Feb. 15, 2013

(65) Prior Publication Data
US 2014/0230408 A1     Aug. 21, 2014

(51) Int. Cl.
*F01N 3/00*     (2006.01)
*F01N 3/10*     (2006.01)
*F01N 3/08*     (2006.01)
*F01N 3/20*     (2006.01)
*F01N 5/02*     (2006.01)
*F01N 13/00*    (2010.01)

(52) U.S. Cl.
CPC ............. *F01N 3/10* (2013.01); *F01N 3/0842* (2013.01); *F01N 3/106* (2013.01); *F01N 3/2066* (2013.01); *F01N 5/02* (2013.01); *F01N 2240/02* (2013.01); *F01N 2240/36* (2013.01); *F01N 2410/06* (2013.01); *F01N 2410/12* (2013.01); *F01N 2610/02* (2013.01); *F01N 13/0097* (2013.01); *F01N 13/0093* (2013.01); *F01N 13/009* (2013.01)

(58) Field of Classification Search
CPC ..... F01N 3/0842; F01N 3/2066; F01N 3/035; F01N 13/02; F01N 13/14; F01N 2610/02; F01N 2610/03; F01N 9/002; F01N 5/02; F01N 2240/02; F02D 41/1441; F02D 41/0295; F02D 41/029; F01P 2060/16
USPC .................... 60/274, 285, 286, 295, 301, 320
See application file for complete search history.

(56) References Cited

U.S. PATENT DOCUMENTS

| | | | |
|---|---|---|---|
| 6,854,263 B1 * | 2/2005 | Bruck et al. | 60/285 |
| 2003/0005686 A1 * | 1/2003 | Hartick | 60/298 |

(Continued)

FOREIGN PATENT DOCUMENTS

EP     1586842 A1 * 10/2005

*Primary Examiner* — Jason Shanske
*Assistant Examiner* — Patrick Maines
(74) *Attorney, Agent, or Firm* — Cantor Colburn LLP

(57) ABSTRACT

In one embodiment, a method for controlling nitrogen oxides in an exhaust gas received by an exhaust system, the exhaust system including a first selective catalytic reduction device, an exhaust gas heat recovery device and a second selective catalytic reduction device is provided. The method includes flowing the exhaust gas from an internal combustion engine into the first selective catalytic reduction device, receiving the exhaust gas from the first selective catalytic reduction device into the exhaust gas heat recovery device and directing the exhaust gas to a heat exchanger in the exhaust gas heat recovery device based on a temperature of the internal combustion engine proximate moving engine components. The method includes adsorbing nitrogen oxides from the exhaust gas via a nitrogen oxide adsorbing catalyst disposed in the heat exchanger and flowing the exhaust gas from the exhaust gas heat recovery device into the second selective catalytic reduction device.

20 Claims, 3 Drawing Sheets

(56) References Cited

U.S. PATENT DOCUMENTS

| | | | |
|---|---|---|---|
| 2006/0021332 A1* | 2/2006 | Gaiser | 60/286 |
| 2008/0141663 A1* | 6/2008 | Ono | 60/311 |
| 2008/0236146 A1* | 10/2008 | Ancimer et al. | 60/286 |
| 2009/0113876 A1* | 5/2009 | Grunditz et al. | 60/278 |
| 2010/0229535 A1* | 9/2010 | Theis | 60/274 |
| 2012/0011836 A1* | 1/2012 | Bruck et al. | 60/320 |
| 2013/0111886 A1* | 5/2013 | Gonze et al. | 60/286 |
| 2013/0118150 A1* | 5/2013 | Gonze et al. | 60/274 |
| 2013/0136675 A1* | 5/2013 | Eigenberger et al. | 423/212 |

* cited by examiner

SYSTEM AND METHOD FOR EXHAUST GAS AFTERTREATMENT

FIELD OF THE INVENTION

The subject invention relates to internal combustion engines, and, more particularly, to exhaust aftertreatment systems for internal combustion engines.

BACKGROUND

An engine control module of an internal combustion engine controls the mixture of fuel and air supplied to combustion chambers of the engine. After the air/fuel mixture is ignited, combustion takes place and the combustion gases exit the combustion chambers through exhaust valves. The combustion gases are directed by an exhaust manifold to a catalyst (or "catalytic converter") and/or other exhaust aftertreatment components.

During certain engine operating conditions combustion gases may enter the exhaust system while components of the aftertreatment system, such as the catalyst, are not yet heated to operating temperatures at which they can adequately reduce or oxidize certain regulated exhaust gas constituents. The issue typically occurs following a cold engine startup. During a cold start (also referred to as "startup period"), relatively cold exhaust system components can have large thermal masses that act as heat sinks, thereby slowing down heating of the exhaust system and the catalysts contained therein to an operating temperature at which the components adequately reduce or oxidize the regulated constituents. Therefore, during the startup period, a slow temperature rise in exhaust system components can lead to undesirable emission levels, due to the corresponding slow response and light-off (i.e. activation) of the exhaust system catalyst(s).

In addition, during the startup period certain moving components of the engine may operate inefficiently due to the fact that the components are relatively cool. After the startup period, these components are heated sufficiently to provide improved efficiency.

SUMMARY OF THE INVENTION

In one exemplary embodiment of the invention, a method for controlling nitrogen oxides in an exhaust gas received by an exhaust system, the exhaust system including a first selective catalytic reduction device, an exhaust gas heat recovery device and a second selective catalytic reduction device is provided. The method includes flowing the exhaust gas from an internal combustion engine into the first selective catalytic reduction device, receiving the exhaust gas from the first selective catalytic reduction device into the exhaust gas heat recovery device and directing the exhaust gas to a heat exchanger in the exhaust gas heat recovery device based on a temperature of the internal combustion engine proximate moving engine components. The method includes adsorbing nitrogen oxides from the exhaust gas via a nitrogen oxide adsorbing catalyst disposed in the heat exchanger and flowing the exhaust gas from the exhaust gas heat recovery device into the second selective catalytic reduction device.

In another exemplary embodiment of the invention, a system includes a first selective catalytic reduction device configured to receive an exhaust gas flow from an internal combustion engine, an exhaust gas heat recovery device positioned downstream of the first selective catalytic reduction device, where the exhaust gas heat recovery device comprises a heat exchanger with a nitrogen oxide adsorbing catalyst disposed in the heat exchanger. The system also includes a controller configured to control a flow of a heat transfer fluid to the heat exchanger based on a temperature of the internal combustion engine proximate moving engine components and a second selective catalytic reduction device positioned downstream of the exhaust gas heat recovery device, wherein the second selective catalytic reduction device is configured to remove nitrogen oxides from the exhaust gas flow at a selected temperature.

The above features and advantages and other features and advantages of are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION OF THE EMBODIMENTS

Figure 1:
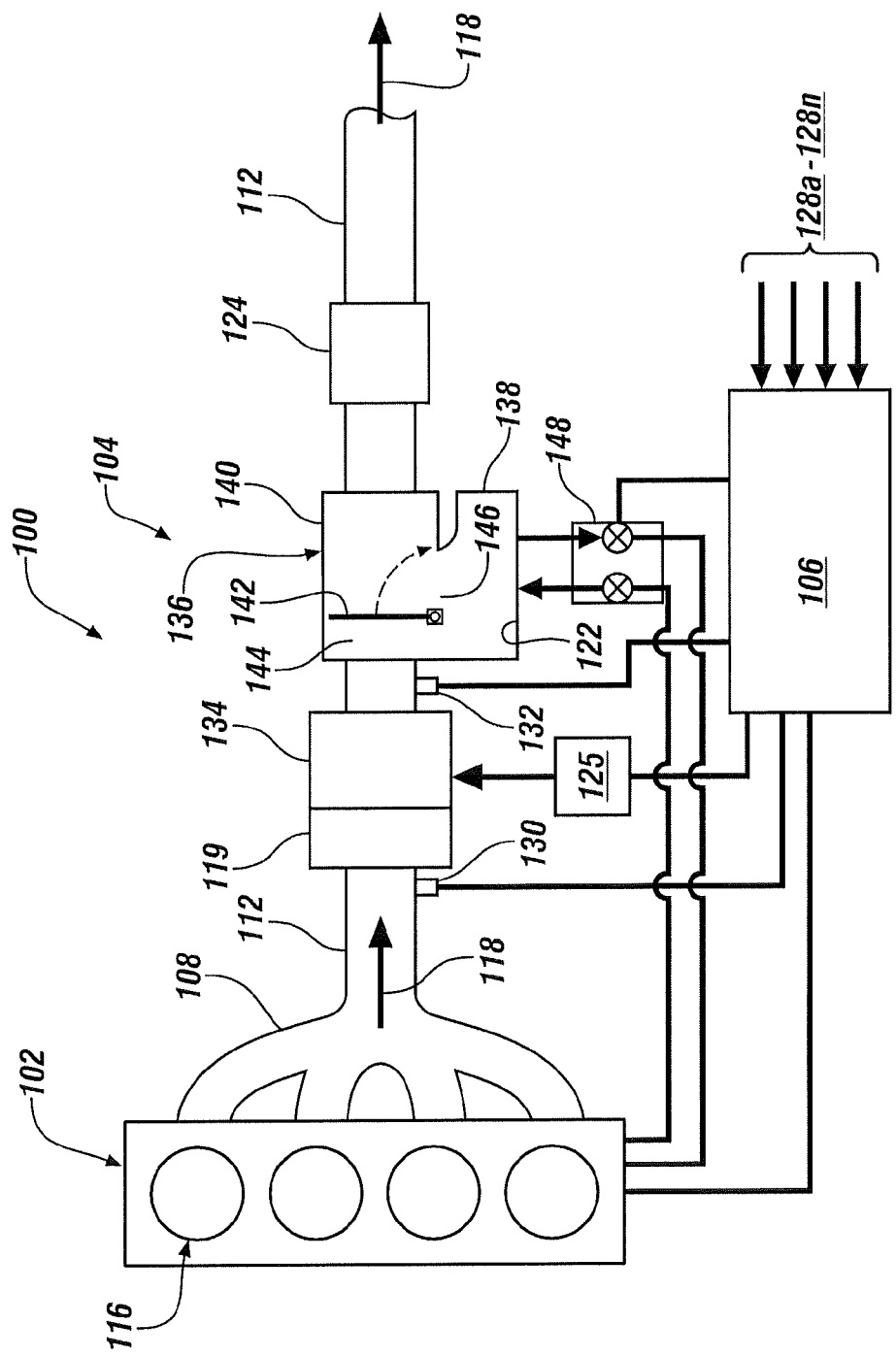
FIG. 1 illustrates an exemplary internal combustion engine including an exemplary exhaust aftertreatment system.

The following description is merely exemplary in nature and is not intended to limit the present disclosure, its application or uses. It should be understood that throughout the drawings, corresponding reference numerals indicate like or corresponding parts and features. As used herein, the terms controller and module refer to an application specific integrated circuit (ASIC), an electronic circuit, a processor (shared, dedicated, or group) and memory that executes one or more software or firmware programs, a combinational logic circuit, and/or other suitable components that provide the described functionality. In embodiments, a controller or module may include one or more sub-controllers or sub-modules. In embodiments, the internal combustion engine may be a spark-ignition engine or a compression-ignition (diesel) engine.

FIG. 1 is a schematic diagram of an embodiment of an engine system 100. The engine system 100 includes an internal combustion engine 102, an exhaust aftertreatment system 104 and an engine controller 106. The exhaust aftertreatment system 104 includes an exhaust manifold 108 and an exhaust conduit 112. Cylinders 116 are located in the internal combustion engine 102, wherein the cylinders 116 receive a combination of combustion air and fuel. The combustion air/fuel mixture is combusted resulting in reciprocation of pistons (not shown) located in the cylinders 116. The reciprocation of the pistons rotates a crankshaft (not shown) to deliver motive power to a vehicle powertrain (not shown) or to a generator or other stationary recipient of such power (not shown) in the case of a stationary application of the internal combustion engine 102. The combustion of the air/fuel mixture causes a flow of exhaust gas 118 through the exhaust manifold 108 and into the exhaust gas aftertreatment system 104, wherein the exhaust aftertreatment system 104 may include an oxidation catalyst 119, a first selective catalytic reduction ("SCR") device 134, an exhaust gas heat recovery ("EGHR") device 136 and a second selective catalytic reduction ("SCR") device 124. The EGHR device includes a heat exchanger 138 and a bypass 140 portion. In an embodiment, a nitrogen oxide adsorbing catalyst ("NAC") 122 is applied to at least a portion of the heat exchanger 138 of the EGHR device 136. The exhaust aftertreatment system 104 reduces, oxidizes, traps or otherwise treats various regulated constituents of the exhaust gas 118, such as nitrogen oxides ("NOx"), carbon monoxide ("CO"), hydrocarbon ("HC") and particulates prior to their release to the atmosphere.

In addition, the exhaust aftertreatment system 104 and a fluid supply 125 are operationally coupled to and controlled by engine controller 106. The engine controller 106 collects information regarding the operation of the internal combustion engine 102 from sensors 128a-128n, such as temperature (intake system, exhaust system, engine coolant, ambient, etc.), pressure, exhaust flow rates, NOx concentrations and, as a result, may adjust the amount of an emission reducing fluid, such as urea or ammonia gas, injected from the fluid supply 125 into the exhaust aftertreatment system 104. In an embodiment, sensors 130 and 132 are sensors configured to determine NOx concentrations. In embodiments, the SCR device 134 also includes a particulate filter configured to remove particulate matter or soot from the exhaust gas flow 118. In an embodiment, the NAC 122 may be a NOx absorbing coating applied to a portion of the heat exchanger 138, where the NAC 122 adsorbs NOx at a first temperature and releases NOx at a second temperature. The first temperature is lower than a threshold and the second temperature is higher than the threshold. In one example, after the NOx is released at the second temperature by the NAC 122 when the SCR device is sufficiently heated to an operating temperature and moving engine components are also sufficiently heated by heat transfer fluid flowing from the heat exchanger 138. In an embodiment, the SCR device 124 is sufficiently heated to remove, by chemical reduction, NOx from the exhaust gas flow 118 as the NAC 122 releases the adsorbed NOx from the heat exchanger 138. In an embodiment, the heat transfer fluid may be heated and directed to selected portions of the engine system 100 to heat the selected portions.

In an embodiment, a valve member 142 controls flow of exhaust gas 118 through the EGHR device 136. The valve member 142 may be operationally coupled to and controlled by engine controller 106. The valve member 142 may be moved to control flow of the exhaust gas 118 through the EGHR device 136, where a position of the valve member 142 controls the amount of exhaust gas 118 flow through the bypass 140 and/or heat exchanger 138. For example, when the valve member 142 is positioned to cover passage 144, the exhaust gas 118 flow is directed substantially entirely into the heat exchanger 138. Further, when the valve member 142 is positioned to cover passage 146, the exhaust gas 118 is directed substantially entirely through the bypass 140. The valve member 142 may also be positioned intermediately between the passages to allow a portion of the exhaust gas 118 to flow each of the heat exchanger 138 and the bypass 140.

With continuing reference to FIG. 1, during a startup period for the exemplary internal combustion engine system 100, components of the exhaust aftertreatment system 104, such as the first and second SCR devices 134 and 124, are relatively "cool" and can take time to be warmed up to an operating temperature. Specifically, when heated to its operating temperature, the first and second SCR devices 134 and 124 reduce NOx more effectively from the exhaust gas flow 118 as compared to when cool during the startup period.

Accordingly, a method and apparatus are provided for the exhaust aftertreatment system 104 to enable the EGHR device 136 and second SCR device 124 to remove NOx from the exhaust gas flow 118 during startup and after being heated at or above an operating temperature, thereby reducing emissions. In addition, moving parts in the internal combustion engine system 100, such as pistons in cylinders 116 and transmission components, are also "cool" during startup, where friction in these moving engine components may lead to reduced performance. In an embodiment, the controller 106 and flow of heat transfer fluid to the EGHR device 136 provide control of heating of moving engine components while also controlling release of NOx from the NAC 122 at a selected time. This provides flexibility as well improved engine performance and NOx removal by allowing the exhaust aftertreatment system 104 to release the NOx at any suitable time after selected components are heated to their operating temperatures. As compared to a system without controlled flow of heat transfer fluid to transport heat from the EGHR device 136, embodiments allow for release of NOx based on several factors instead of solely depending upon an exhaust gas temperature. As discussed herein, the operating temperature for a device or engine is a temperature or range of temperatures where the device or engine functions efficiently (e.g., low friction for a moving engine component, or removal of selected particulates from an catalyzing oxidation or reduction of exhaust gas) and/or effectively. For example, the operating temperature for an SCR device is a temperature or range of temperatures where the device is able to reduce a sufficient amount of NOx to achieve selected emission control targets.

In an embodiment, the EGHR device 136 includes a fluid supply and control 148 used to remove heat from exhaust gas 118 flowing through the heat exchanger 138. In embodiments, the fluid supply and control 148 includes a valve to control flow of a heat transfer fluid to the heat exchanger 138 and internal combustion engine 102. The heat transfer fluid may remove heat from the exhaust gas 118 during an engine startup period, when moving components in the internal combustion engine 102 are at a temperature below their operating temperature and, thus, may experience increased friction. The engine system operating temperature is a temperature or range of temperatures where the engine and transmission (not shown) have reduced friction and thus operate efficiently. Accordingly, by providing heat from the heat exchanger 136 to the internal combustion engine 102 at startup, the arrangement improves engine efficiency while the engine components are cool at startup. In addition, during the startup period, the controller 106 positions the valve member 142 to direct the exhaust gas 118 flow into the heat exchanger 138, where the NAC 122 in the heat exchanger adsorbs the NOx from the exhaust gas. NOx is not removed from exhaust gas 118 by the first SCR device 134 during startup due to the SCR device 134 being at a temperature below its operating temperature. Thus, by adsorbing the NOx in the NAC 122, this exhaust gas 118 constituent is removed while exhaust aftertreatment components are relatively cool.

In an embodiment, the heat exchanger 138, fluid supply and control 148, valve member 142 and controller 106 continue to flow exhaust gas 118 and heat transfer fluid through the heat exchanger and provide heat to the engine 102 after the first and second SCR devices 134 and 124 are at the operating temperature. Further, when the engine is at its operating temperature and no longer utilizes or requires heat provided by the fluid from the heat exchanger 138, the valve member 142 may be moved to restrict flow through passage 146 and promote flow through passage 144 to heat the SCR device 124 to its operating temperature. After the SCR device 124 is heated to its operating temperature, the controller 106 may restrict heat transfer fluid flow between the heat exchanger 138 and the internal combustion engine 102 and may also move the valve member 142 to cause a portion of exhaust gas 118 to flow through the bypass 140 and remaining portion to flow through the NAC 122. Thus, the portions of the exhaust gas 118 flowing through the bypass 140 and the NAC 122 causes release of the adsorbed NOx from the NAC 122, where the released NOx is reduced by the SCR device 124 that has been heated to its operational temperature. Accordingly, the NOx release from the NAC 122 is based on the internal combustion engine 102 being heated to an operating temperature, not needing heat from the EGHR device 136 while the first and second SCR devices 134 and 124 are also heated to their operating temperatures. Embodiments of the process and system do not release the NOx from the NAC 122 based on the exhaust gas temperature, but instead based on the engine operating efficiently, by selected portions of the engine reaching their operating temperatures, in addition to other parameters and code within the controller 106. In embodiments, the selected portions of the engine include moving components of the engine.

In an embodiment, the NAC 122 is downstream of the first SCR device 134 and is configured to adsorb or capture NOx from the exhaust gas flow 118 at a first temperature. Further, the NAC 122 is configured to release the adsorbed NOx at a second temperature that is higher than the first temperature. The exemplary NAC 122 is a coating of suitable NOx adsorbing material applied to the heat exchanger 138 portion of the EGHR device 136, where the coating may be applied to any suitable portion of the interior of the device exposed to exhaust gas 118, such as the housing or a substrate such as a flow-through monolith, disposal in the housing. Exemplary materials for the NAC 122 include, but are not limited to, mixed metal oxide, hydrotalcite, SSZ-13 type of zeolite with a base metal component (such as copper or a platinum group metal), basic metal oxides ($\gamma$-$Al_2O_3$, $CeO_2$, $MgO$, $MgO/Al_2O_3$, $BaO/Al_2O_3$, $K_2O/Al_2O_3$) and metal exchanged zeolites (Na-exchanged and Ba-exchanged faujasite, such as NaY and BaY, as well as Cu-exchanged and Fe-exchanged Beta).

In one embodiment, the first and second SCR devices 134 and 124 are configured to reduce NOx from the exhaust gas 118 at or above a threshold operating temperature, such as about 150 degrees C. In other embodiments, the operating temperature is at or above about 175 degrees C. In yet other embodiments, the operating temperature is at or above about 200 degrees C. Reductant fluid may be added to the SCR devices to assist in NOx removal. At lower exhaust flow rates, the temperature for initiating fluid (e.g., urea) injection from the fluid supply 125 is about 150 degrees C. At higher exhaust flow rates, the temperature for fluid injection is higher, such as about 175 to about 200 degrees C.

An exemplary start up period begins when a "cool" engine (i.e., not warmed up) is started. In embodiments, certain components are not sufficiently heated to operate efficiently during the start up period. Specifically, the first and second SCR devices 134 and 124 may not remove NOx at a desired rate, such as to reduce levels to meet certain regulations or targets, during the start up period. Thus, in an embodiment, the NAC 122 is configured to adsorb NOx from the exhaust gas flow 118 during the start up period. After the start up period, the NAC 122 is heated and can no longer adsorb NOx. In an embodiment, following a cold startup, the first and second SCR devices 124 and 134 and the NAC 122 are substantially cool at a first temperature and the NAC 122 adsorbs NOx at or below its NOx "release" temperature. The release temperature is a temperature at which the NAC 122 slows or stops adsorbing NOx and begins to release adsorbed NOx. After the start up period, when the controller 106 stops flow of heat transfer fluid to the heat exchanger 138 and causes exhaust gas 118 flow in the EGHR device 136 to flow through the bypass 140 and heat exchanger 138, the NAC 122 and second SCR device 124 are at a second temperature above a threshold temperature (i.e., about equal to the release temperature of the NAC and the operating temperature of the SCR), wherein the NAC 122 releases the NOx and the second SCR device 124 is sufficiently heated (by exhaust flow) to reduce NOx from in exhaust gas. In embodiments, the first temperature is below about 100 degrees C. and the second temperature is equal to or greater than about 150 degrees C. In the example, the NAC 122 and second SCR device 124 are heated from below about 100 degrees C. to about 150 degrees C. during the start up period, wherein the components are at or above 150 degrees C. after the start up period.

The OC device 119 may include, for example, a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits or passages. The oxidation catalyst compound may be applied as a wash coat and may contain platinum group metals such as platinum (Pt), palladium (Pd), rhodium (Rh) or other suitable oxidizing catalysts. The first and second SCR devices 124 and 134 may include, for example, a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits. The substrate can include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 118 in the presence of a reductant such as ammonia ($NH_3$). An $NH_3$ reductant may be supplied from a fluid supply 125 (reductant supply) and may be injected into the exhaust gas 118 at a location upstream of the first and second SCR devices 134 and 124 using an injector. The reductant may be in the form of a gas, a liquid, or an aqueous urea solution and may be mixed with air in the injector to aid in the dispersion of the injected spray.

Figure 2:
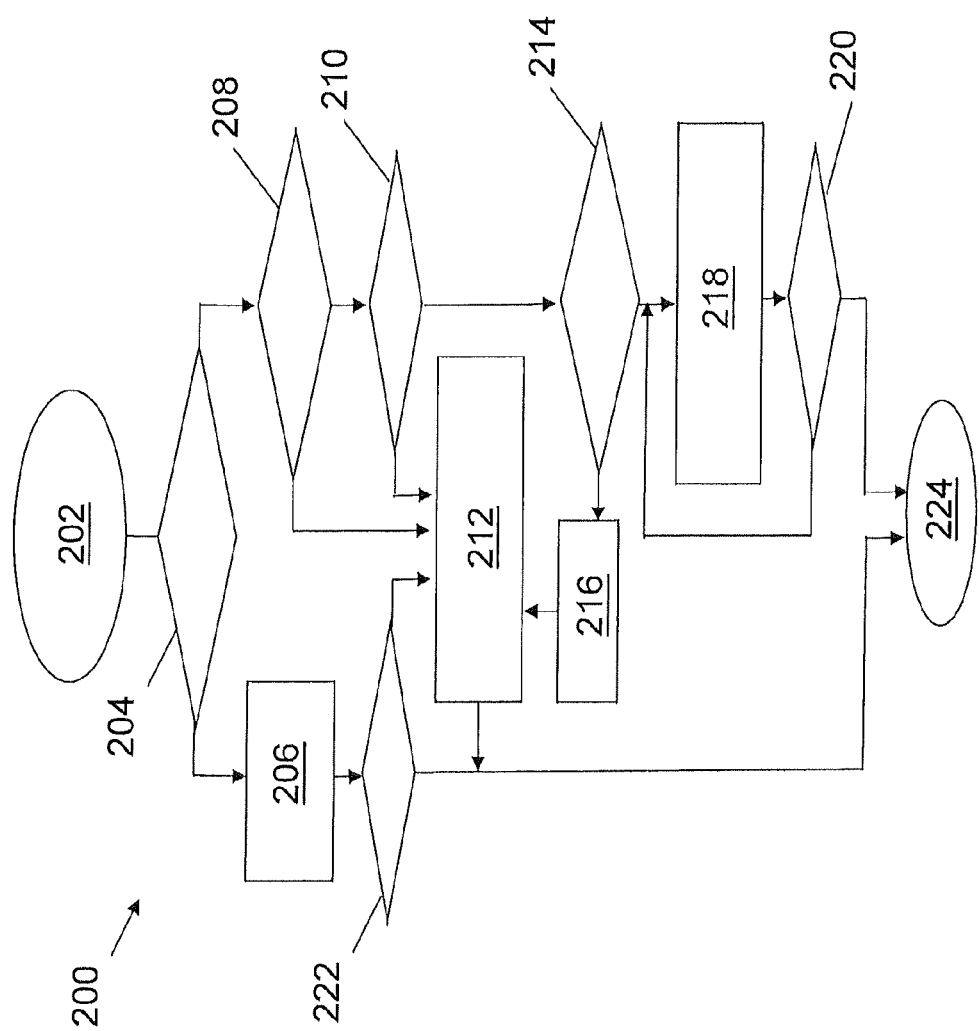
FIG. 2 is a diagram of an exemplary method and system for nitrogen oxides removal and exhaust gas heat recovery in the exemplary internal combustion engine and associated exhaust system shown in FIG. 1.

FIG. 2 is a flow chart of an exemplary process 200 for operation of an exhaust aftertreatment system, such as exhaust aftertreatment system 104 (FIG. 1). The depicted flowchart illustrates the architecture, functionality, and operation of possible implementations of systems and methods according to various embodiments of the process. It should be noted that, in some implementations, the functions noted in the blocks may occur out of the order shown. Further, additional blocks may be added to or removed from the process in certain embodiments to accommodate certain applications. Parameters determined by and used in the process 200 may be determined by any suitable method, such as modeling, equations, logged data, sensor measurements or any combination thereof. In block 202, the process for exhaust gas aftertreatment is started. The process includes using a fluid, such as heat transfer fluid (e.g., engine coolant), flowing from the EGHR device 136 to heat selected portions of the engine system 100 to improve efficiency during startup. The process also includes reduction of constituents from the exhaust gas 118 by first and second SCR devices 134, 124 as well as removal of constituents by EGHR device 136 and PF 119. In block 204, temperatures for exhaust aftertreatment system 104 components and/or internal combustion engine 102 components are determined. In an embodiment, the temperature of the internal combustion engine 102 is determined (e.g., sensed by a sensor). In another embodiment, the temperatures of exhaust aftertreatment system 104 components, such as first and second SCR devices 124, 134 are determined. The temperature(s) may then be compared to threshold or operating temperatures, for example operating temperatures for the first and second SCR devices 134, 124 and internal combustion engine operating temperatures. In block 206, if the temperature is below the threshold, such as when the engine system and exhaust components are cool at startup, an exhaust gas heat recovery occurs where exhaust gas 118 flows through the heat exchanger 138 while the heat transfer fluid flows to transfer heat from the heat exchanger 138 to the internal combustion engine 102, thus reducing friction for certain engine components. In block 208, if the temperature is above the threshold, such as when the engine system is heated to an operating temperature, a determination is made if the second SCR device 124 downstream of the EGHR device 136 is heated to an operating temperature (e.g., above a threshold).

In block 210, if the SCR device 124 is heated above the operating temperature, a NOx level for the NAC 122 is checked. In block 214, if there is some NOx present in the NAC 122, a level of reductant fluid in the SCR device 124 downstream of the EGHR device 136 is checked. A proper level of reductant fluid may be provided by injecting the fluid supply 125 to the first SCR device 134 to a level where a portion of the fluid slips or is carried to the second SCR device 124 by the exhaust gas 118. The proper or optimal level of reductant fluid provided to the first SCR device 134 enables conversion of the received NOx to another constituent within the device. In block 218, if the level of reductant fluid is proper and the internal combustion engine 102 is heated to an efficient operating temperature, the EGHR device 136 initiates a release or purge of NOx retained by the NAC 122. In an embodiment, the controller 106 stops or restricts circulation of coolant fluid supply 125 through the heat exchanger 138 to enable a temperature increase for the NAC 122 in the heat exchanger 138. Further, the controller 106 changes the position of valve member 142 to cause a balanced exhaust gas 118 flow through the bypass 140 and the heat exchanger 138. The exhaust gas 118 flow through the heat exchanger 138 heats the NAC 122 to a release temperature at which NOx is released from the NAC 122. The flow through bypass 140 also provides heat to the second SCR device 124, thereby ensuring that it is maintained above its operating temperature to convert the released NOx. In block 220, a check of the NOx level in the NAC 122 is made, where the process returns to block 218 if NOx remains and advances to block 224 if there is no more NOx. Once reaching block 224, the process cycles back to block 202 to continuously check system temperatures and parameters against threshold values.

With continued reference to FIG. 2, as the exhaust gas heat recovery process continues in block 206, a NOx level for the NAC 122 is checked in optional block 222. In some embodiments, there is no checking in block 222 and the process advances to block 212 following block 206. In an embodiment, if the NAC 122 does not have a NOx level greater than a threshold in block 222, the process advances to the block 224. As stated above, once reaching block 224, the process cycles back to block 202. In embodiments, the threshold value is 50%, 75% or 90% full of NOx. If the NAC 122 level exceeds the threshold NOx level in block 222, the process advances to block 212, where the second SCR device 124 is heated to an operating or light-off temperature by moving the valve member 142 and flowing exhaust gas 118 through the bypass 140. In embodiments, the SCR device 124 is heated when a portion of the exhaust gas 118 flows through the bypass 140. In other embodiments, the entire exhaust gas 118 flow is directed through the bypass 140 into the first SCR device 124. With reference to block 208, if the SCR device 124 temperature is below the threshold temperature, the process will advance to block 212 to heat the second SCR device 124 to the operating temperature to remove NOx. With reference to block 210, if the NAC 122 is empty (e.g., contains substantially low or no NOx levels), the process will advance to block 212 to heat SCR device 124 to the operating temperature to remove NOx. In addition, in block 214, if the reductant fluid received by the SCR device 124 is low, the process advances to block 216 where the fluid supply 125 provides additional fluid that slips to the second SCR device 124 until it reaches the desired level for NOx reduction in the SCR. Once the desired reductant level is achieved, the second SCR device 124 is heated to the operating temperature in block 212. Regardless of the previous blocks completed, once the second SCR device 124 is heated to operating temperature in block 112, the process advances to block 224.

In embodiments, the exhaust aftertreatment system 104 components, such as first and second SCR devices 134 and 124, may be heated to an operating temperature after startup, but the fluid supply and control 148 may continue to flow fluid to provide heat to moving components in the internal combustion engine 102. Thus, the exhaust gas 118 continues to flow through the heat exchanger 138 while the first and second SCR devices 134, 124 are reducing NOx (and the NAC 122 is not removing NOx). Accordingly, the EGHR device 136 continues to aid in engine friction reduction after the NOx adsorption is not needed. After the moving components in the internal combustion engine 102 are sufficiently heated to an operating temperature, flow of heat transfer fluid between the heat exchanger 138 and internal combustion engine is reduced or stopped while exhaust gas 118 flow through the heat exchanger 138 is also reduced to allow heating of the second SCR device 124 to an operating temperature. Once the second SCR device 124 is heated to the operating temperature, the NAC 122 is heated to its release temperature due to reduced heat transfer fluid flow, where the NAC 122 releases the NOx to the second SCR device 124 for removal. Accordingly, embodiments base the release of NOx from the NAC 122 on temperatures of engine components rather than based on exhaust aftertreatment system 104 components.

Figure 3:
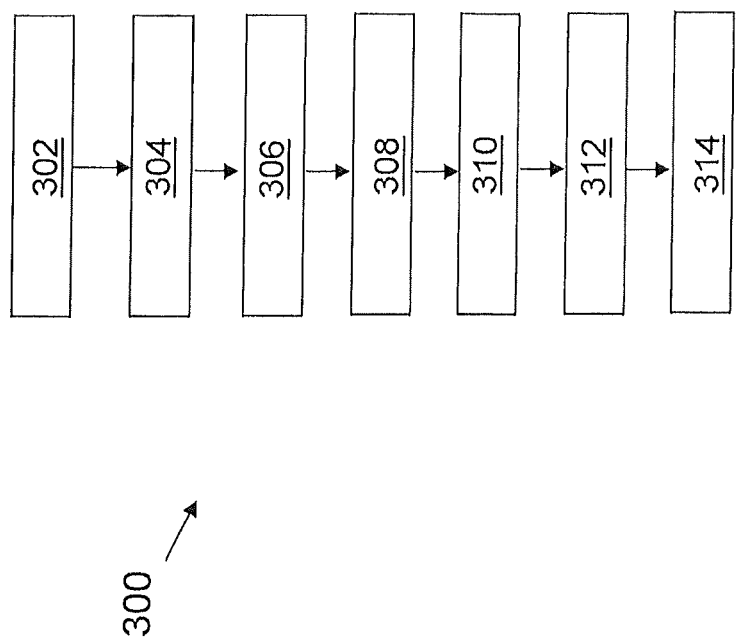
FIG. 3 is a diagram of another exemplary method and system for nitrogen oxides removal and exhaust gas heat recovery in the exemplary internal combustion engine and associated exhaust system shown in FIG. 1.

FIG. 3 is a flow chart of an exemplary process 300 for operation of an exhaust aftertreatment system, such as exhaust aftertreatment system 104 (FIG. 1). The depicted flowchart illustrates the architecture, functionality, and operation of possible implementations of systems and methods according to various embodiments of the process. It should be noted that, in some implementations, the functions noted in the blocks may occur out of the order shown. Further, additional blocks may be added to or removed from the process in certain embodiments to accommodate certain applications. Parameters determined by and used in the process 300 may be determined by any suitable method, such as modeling, equations, logged data, sensor measurements or any combination thereof. In block 302, the exhaust gas 118 from the internal combustion engine flows into the first SCR device 134. In block 304, exhaust gas is received from the first SCR device 134 in the EGHR device 136. In block 306, the exhaust gas 118 is directed to the heat exchanger 138 in the EGHR device 136 based on a temperature of the internal combustion engine 102 proximate the moving engine components. In embodiments, a temperature of the internal combustion engine 102 proximate the moving engine components provides is used as an input to control operation of the EGHR device 136. The temperature(s) proximate moving engine components, such as the engine block housing the cylinders 116 and transmission components, will be relative cool at startup and will be heated to an operating temperature when running efficiently. Moving engine components typically experience higher friction while the engine is cool, such as during startup, and, thus, improve engine performance as they are heated by the heat transfer fluid from heat exchanger 138. In block 308, nitrogen oxides are adsorbed from the exhaust gas via the NAC 122 applied to the heat exchanger 138. In block 310, a heat transfer fluid flows through the EGHR device 136 to receive heat from the EGHR device and provide heat to the internal combustion engine 102, such as to the moving engine components described above. In addition, a controller 106 controls flow of a heat transfer fluid to the heat exchanger 138 to control a temperature of the NAC 122. In block 312, the exhaust gas flows from the EGHR device 136 into the SCR device 124. In block 314, a reductant fluid is injected into the first SCR device 124 to assist in nitrogen oxides reduction in the first and second SCR devices 134 and 124.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling nitrogen oxides in an exhaust gas received by an exhaust system of an internal combustion engine, wherein the exhaust system comprises a first selective catalytic reduction device, an exhaust gas heat recovery device and a second selective catalytic reduction device, the method comprising:
   flowing the exhaust gas from the internal combustion engine into the first selective catalytic reduction device;
   receiving the exhaust gas from the first selective catalytic reduction device into the exhaust gas heat recovery device;
   directing the exhaust gas to a heat exchanger in the exhaust gas heat recovery device based on a temperature of the internal combustion engine proximate moving engine components;
   adsorbing nitrogen oxides from the exhaust gas via a nitrogen oxide adsorbing catalyst disposed in the heat exchanger; and
   flowing the exhaust gas from the exhaust gas heat recovery device into the second selective catalytic reduction device.

2. The method of claim 1, further comprising receiving a heat transfer fluid flow in the exhaust gas heat recovery device to receive heat from the exhaust gas heat recovery device.

3. The method of claim 2, further comprising controlling flow of a heat transfer fluid to the heat exchanger to control a temperature of the nitrogen oxide adsorbing catalyst.

4. The method of claim 1, further comprising injecting a reductant fluid into the first selective catalytic reduction device to assist in nitrogen oxides reduction in the first and second selective catalytic reduction devices.

5. The method of claim 1, wherein the first selective catalytic reduction device reduces nitrogen oxides at a first selected temperature, the second selective catalytic reduction device reduces nitrogen oxides at a second selected temperature and the nitrogen oxide adsorbing catalyst adsorbs nitrogen oxides at a temperature less than the first and second selected temperatures.

6. The method of claim 1, wherein directing the exhaust gas to the heat exchanger comprises:
   directing the exhaust gas to the nitrogen oxide adsorbing catalyst in the heat exchanger at a first temperature during a startup period; and
   reducing flow of the exhaust gas to the nitrogen oxide adsorbing catalyst, wherein nitrogen oxides are released from the nitrogen oxide adsorbing catalyst at a second temperature that is greater than the first temperature, the reducing flow of the exhaust gas based on the internal combustion engine being warmed up to an operating temperature.

7. The method of claim 1, further comprising controlling a flow of a heat transfer fluid to the heat exchanger based on the temperature of the internal combustion engine proximate moving engine components, where the nitrogen oxide adsorbing catalyst is heated to release nitrogen oxides when the flow of heat transfer fluid is reduced and the internal combustion engine is efficiently operating.

8. The method of claim 1, further comprising controlling a position of a valve member to control flow of the exhaust gas to a bypass and a heat exchanger within the exhaust gas heat recovery device, the nitrogen oxide adsorbing catalyst being disposed in the heat exchanger, wherein the controlling of the position of the valve member is based on a temperature of the internal combustion engine.

9. A system comprising:
   a first selective catalytic reduction device configured to receive an exhaust gas flow from an internal combustion engine;
   an exhaust gas heat recovery device positioned downstream of the first selective catalytic reduction device, where the exhaust gas heat recovery device comprises a heat exchanger with a nitrogen oxide adsorbing catalyst disposed in the heat exchanger;
   a controller configured to control a flow of a heat transfer fluid to the heat exchanger based on a temperature of the internal combustion engine proximate moving engine components; and
   a second selective catalytic reduction device positioned downstream of the exhaust gas heat recovery device, wherein the second selective catalytic reduction device is configured to remove nitrogen oxides from the exhaust gas flow at a selected temperature.

10. The system of claim 9, wherein the nitrogen oxide adsorbing catalyst is heated to release nitrogen oxides when the flow of the heat transfer fluid is reduced and the internal combustion engine proximate moving engine components is heated to an operating temperature.

11. The system of claim 9, further comprising a valve in the exhaust gas heat recovery device to control the exhaust gas flow through the heat exchanger.

12. The system of claim 11, wherein the valve in a first position causes the exhaust gas flow to be directed to the nitrogen oxide adsorbing catalyst in the heat exchanger at a first temperature during a startup period and in a second position causes a reduced exhaust gas flow to the nitrogen oxide adsorbing catalyst, where nitrogen oxides are released from the nitrogen oxide adsorbing catalyst at a second temperature.

13. An exhaust aftertreatment system, comprising:
   a first selective catalytic reduction device configured to receive an exhaust gas flow from an internal combustion engine;
   an exhaust gas heat recovery device positioned downstream of the first selective catalytic reduction device, where the exhaust gas heat recovery device comprises a heat exchanger with a nitrogen oxide adsorbing catalyst disposed in the heat exchanger and a valve to control flow of the exhaust gas flow through the heat exchanger; and
   a second selective catalytic reduction device positioned downstream of the exhaust gas heat recovery device, wherein the second selective catalytic reduction device is configured to reduce nitrogen oxides from the exhaust gas flow at a selected temperature.

14. The exhaust aftertreatment system of claim 13, wherein the exhaust gas heat recovery device receives a heat transfer fluid flow to receive heat from the exhaust gas heat recovery device.

15. The exhaust aftertreatment system of claim 13, wherein the exhaust gas heat recovery device comprises a heat transfer fluid valve to control flow of a heat transfer fluid to the heat exchanger.

16. The exhaust aftertreatment system of claim 13, further comprising a reductant fluid injector upstream of the first selective catalytic reduction device to assist in nitrogen oxides reduction in the first and second selective catalytic reduction devices.

17. The exhaust aftertreatment system of claim 13, wherein the first selective catalytic reduction device reduces nitrogen oxides at the selected temperature and the nitrogen oxide adsorbing catalyst adsorbs nitrogen oxides at a temperature less than the selected temperature.

18. The exhaust aftertreatment system of claim 13, wherein the valve in a first position causes exhaust gas to flow to the nitrogen oxide adsorbing catalyst in the heat exchanger at a first temperature during a startup period and in a second position causes a reduced exhaust gas flow to the nitrogen oxide adsorbing catalyst, where nitrogen oxides are released from the nitrogen oxide adsorbing catalyst at a second temperature based on the internal combustion engine proximate moving engine components being warmed up to an operating temperature.

19. The exhaust aftertreatment system of claim 13, further comprising a controller configured to control a flow of a heat transfer fluid to the heat exchanger based on a temperature of the internal combustion engine proximate moving engine components, where the nitrogen oxide adsorbing catalyst is heated to release nitrogen oxides when the flow of heat transfer fluid is reduced and the internal combustion engine is efficiently operating.

20. The exhaust aftertreatment system of claim 13, wherein the nitrogen oxide adsorbing catalyst comprises a basic metal oxide or metal exchanged zeolite.

* * * * *